United States Patent [19]

Sugihara

[11] Patent Number: 5,744,222
[45] Date of Patent: Apr. 28, 1998

[54] BEDDING MATERIAL CONTAINING ELECTRETIC FIBERS

[75] Inventor: Toshio Sugihara, Tokyo, Japan

[73] Assignee: Life Energy Industry Inc., Tokyo, Japan

[21] Appl. No.: 677,888

[22] Filed: Jul. 10, 1996

[51] Int. Cl.$^6$ .................................................. B32B 3/00
[52] U.S. Cl. ...................... 428/196; 442/205; 442/228; 442/244; 442/268
[58] Field of Search .................... 428/102, 196; 442/417, 205, 228, 244, 268

[56] References Cited

U.S. PATENT DOCUMENTS 5,601,909  2/1997  Kubo .............................. 442/417

FOREIGN PATENT DOCUMENTS 5-7027  3/1991  Japan .

Primary Examiner—Christopher Raimund
Attorney, Agent, or Firm—Jacox, Meckstroth & Jenkins

[57] ABSTRACT

The bedding of the present invention comprises a front cloth, a textural three-dimensional structure woven three-dimensionally, and a rear cloth. At least a portion of the fibers forming the front cloth the textural three-dimensional structure, and the rear cloth are electretic fibers containing microparticles of a substance having an electretic property, such as tourmaline. The front cloth, the textural three-dimensional structure, and the rear cloth are sewn together at their peripheral edges. The electretic fibers are affixed with ceramic microparticles of one or more types of ceramic such as cordierite, β-spodumene, zirconia, zircon, magnesia and aluminum titanate.

9 Claims, 8 Drawing Sheets

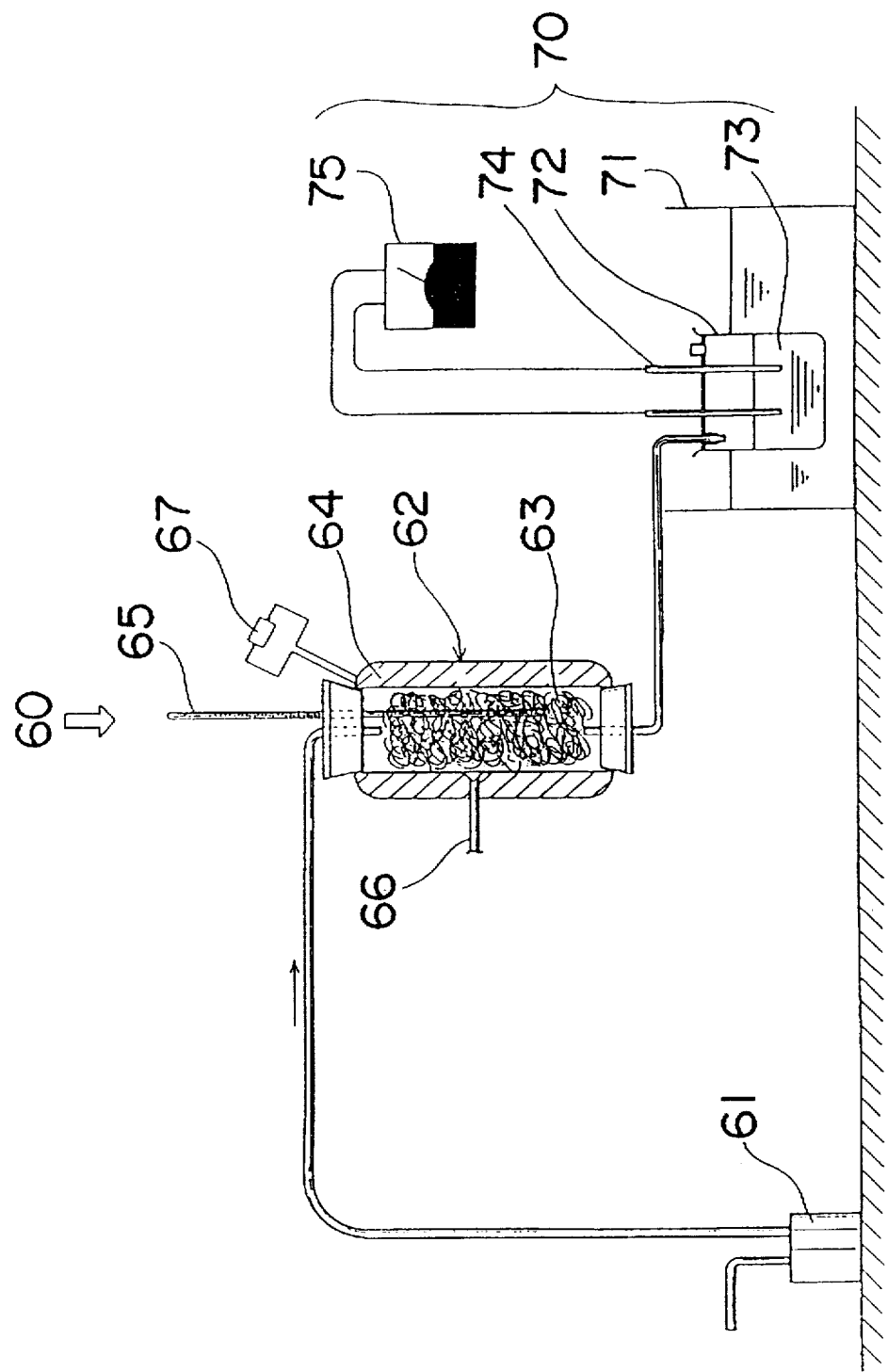

5,744,222

BEDDING MATERIAL CONTAINING ELECTRETIC FIBERS

BACKGROUND OF THE INVENTION

1. Technical Field of the Invention

The present invention relates to beddings, for example mattresses, having the function of increasing the activity of bodily cells.

2. Background Art

Conventionally, pads formed from a three-dimensional knit-mesh material having the function of preventing bedsores have been described in Japanese Utility Model Application, Second Publication No. 5-27902. These pads are formed from a three-dimensional knit-mesh material, layered cotton and cloth, wherein the layered cotton fibers are reciprocally affixed by means of adhesives in order to prevent the layered cotton fibers from falling out of the three-dimensional knit-mesh material or becoming caught within the mesh portion when the three-dimensional knit-mesh material and the layered cotton are attached. That is, these pads are formed by quilting the three-dimensional knit-mesh material, the layered cotton and the cloth.

However, while the above-mentioned conventional pads are capable of ensuring the air ventilation, they do not emit active ions which confer increased activity to bodily cells.

SUMMARY OF THE INVENTION

Having turned their attention to minerals such as tourmaline which have the property of spontaneous polarization, the present inventors discovered that it is possible to achieve the effect of radiating various types of active ions which have beneficial physiological effects by pulverizing this type of mineral into microparticles and mixing these into the fibers along with ceramics which emit far-IR radiation. The above tourmaline microparticle-mixed fibers are capable not only of emitting far-IR radiation, but also of emitting active ions in air, the activation effect of these ions having various beneficial effects on the body.

The present invention is based on the above-mentioned observations, and has the object of offering a bedding which has excellent physiological activation effects, is capable of being wholly washed, has superb ventilation and is therefore easily dried, is highly elastic, and is extremely comfortable.

In order to achieve the above objects, the bedding of the present invention comprises a front cloth; a textural three-dimensional structure woven three-dimensionally; and a rear cloth; wherein fibers within at least a portion of said front cloth, said textural three-dimensional structure, and said rear cloth are electretic fibers which contain microparticles of a substance having an electretic property; and peripheral portions of said front cloth, said textural three-dimensional structure, and said rear cloth are mutually affixed.

Since the front cloth, the textural three-dimensional structure, the rear cloth and the non-woven fabric used in the bedding of the present invention contain electretic fibers, these can emit active ions in order to increase the physiological activity of the body which contacts the bedding.

Additionally, not only can the bedding of the present invention exhibit a piezoelectric effect by applying kinetic energy to the electretic minerals during washing, but a pyroelectric effect is also exhibited when the minerals having spontaneous polarization properties are exposed to sunlight during drying. Thus, the bedding of the present invention is able to electrically activate the minerals having spontaneous polarization properties while the bedding is being washed, thereby allowing the effect of increasing the activity of bodily cells to be improved.

BRIEF DESCRIPTION OF THE DRAWINGS

FIG. 12 is a diagram showing a test device for measuring the effects of the embodiments.

PREFERRED EMBODIMENTS OF THE INVENTION

Figure 1:
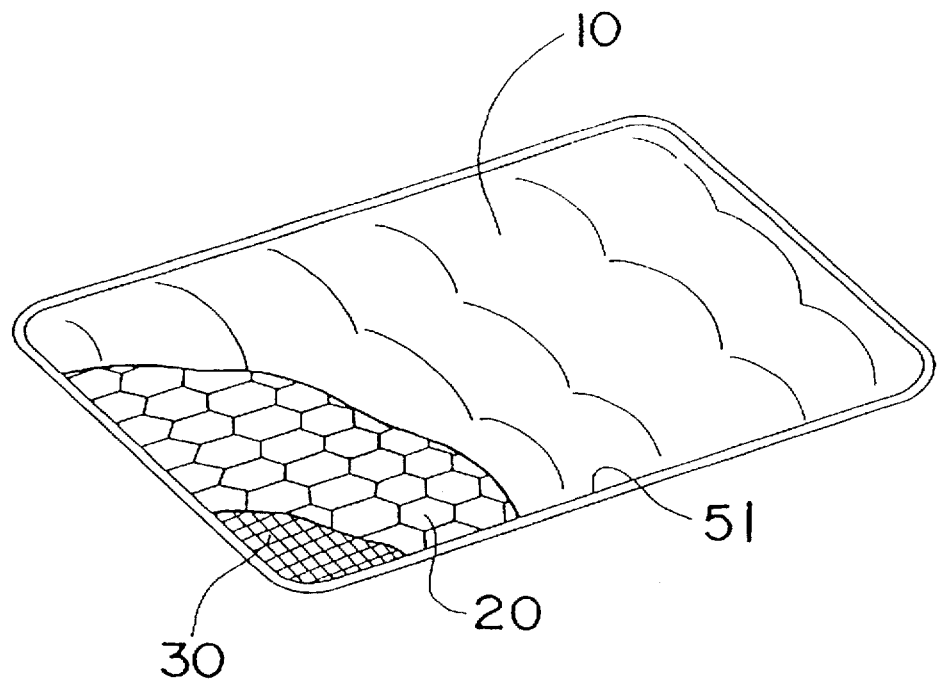
FIG. 1 is a perspective cutaway view of an embodiment of the bedding according to the present invention.
Figure 2:
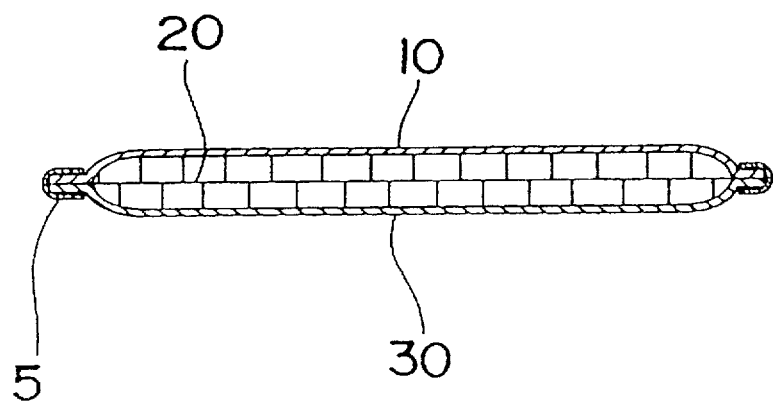
FIG. 2 is a section view showing the same embodiment.

FIGS. 1 and 2 show an embodiment of a bedding according to the present invention. This bedding comprises a front cloth 10, a textural three-dimensional structure 20, and a rear cloth 30. The peripheral edges of these elements are sewn together. Additionally, each layer 10, 20 and 30 are sewn together in quilting fashion in order to prevent mutual positional shifting. Furthermore, as mentioned below, it is also possible to add a non-woven fabric 40 or cushioning fleece 50.

A feature of the present invention is that an electretic fiber containing microparticles of a substance having a spontaneous polarization property (electretic or pyroelectric) is used for at least a portion of the fibers forming the front cloth 10, the textural three-dimensional structure 20 and a rear cloth 30.

In this embodiment, the material of the front cloth 10 is a material wherein electretic fibers 2 are combined with cotton and blended yarn. As a specific example of the electretic fabric 2, a rayon fabric containing microparticles of an electretic mineral may be used to form a stretchable fabric formed from rayon fiber (21%), cotton fiber (50%), polyester fiber (26%) and polyurethane fiber (3%). Other fibers which may be used in the front cloth 10 include regenerated fibers such as rayon and cuprammonium rayon, semi-synthetic fibers such as acetate, synthetic fibers such as polyester, polyurethane, polyamides, polyvinyl chloride, polyvinyl alcohol and polyacryl, and natural fibers such as cotton, hemp, silk and wool.

Figure 5:
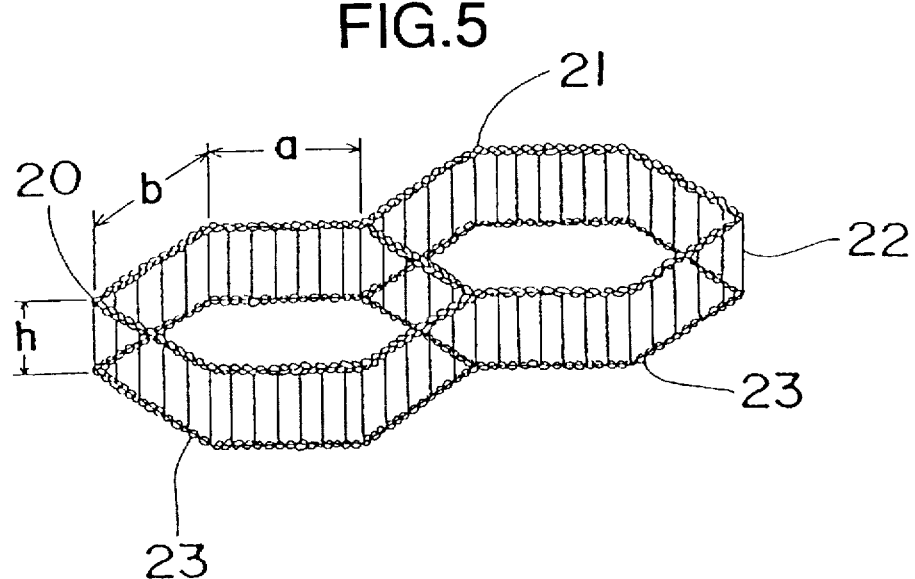
FIG. 5 is an enlarged perspective view showing an example of a textural three-dimensional structure as used in the present invention.

As shown in FIG. 5, the textural three-dimensional structure 20 is formed by connecting an upper mesh fabric 21 with a lower mesh fabric 23 by means of connecting thread 22 in a three-dimensional honeycomb shape. While the textural three-dimensional structure 20 shown in the drawing is arranged into two (top and bottom) layers, it is possible to have only a single layer, or three or more layers. The three-dimensional shape of the textural three-dimensional structure may be square or octagonal as an alternative to the hexagonal shape shown in the drawing. Each unit (such as the size of the cells) in the three-dimensional construction can also be changed as appropriate.

The material of the textural three-dimensional structure 20 may be a blended yarn, for example of cotton (65%) and polyester (35%), or a weave of this blended yarn and nylon 66 yarn. Nylon 66 (polyamide) yarn is suited for the connecting thread 22 as an elastic monofilament, but the material is not restricted thereto. For example, the upper and lower mesh fabrics 21 and 23 may be formed from a blended yarn using electretic fiber 2 (30%), cotton (35%) and polyester (35%). Furthermore, electretic fiber 2 may be woven into the connecting thread 22 to form a blend. As other materials for this textural three-dimensional structure 20, it is possible to use the above-mentioned regenerated fibers, semi-synthetic fibers, synthetic fibers or natural fibers singly or in combination.

As the material for the rear cloth 30, a mesh fabric formed from polyester (100%) may be used. This acts to maintain the overall shape, as well as to prevent stray fibers or hair from entering the textural three-dimensional structure 20. It is also possible to add aluminum to a portion or the entirety of the material of the rear cloth 30 in order to reflect the far-IR radiation emitted from the upper layers. Such aluminum materials can be included, for example, by weaving aluminum lateral thread into polyester longitudinal thread at a proportion of 2:1. In this case, a far-IR radiation reflection function can be obtained while simultaneously allowing moisture to escape from the rear cloth 30. Alternatively, aluminum materials can be added to a portion or the entirety of the rear cloth 30 material by selecting from commonly known techniques depending on the types of material.

Figure 4A:
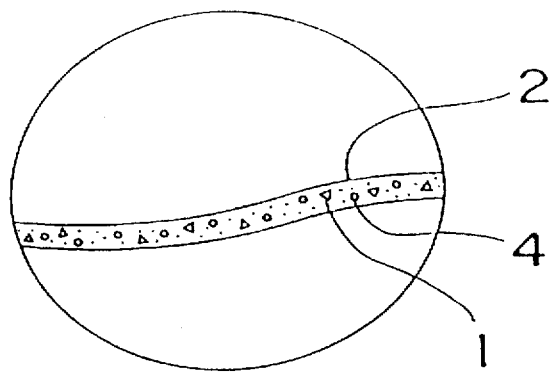
FIG. 4A is an enlarged view showing an electretic fiber according to the present invention.
Figure 4B:
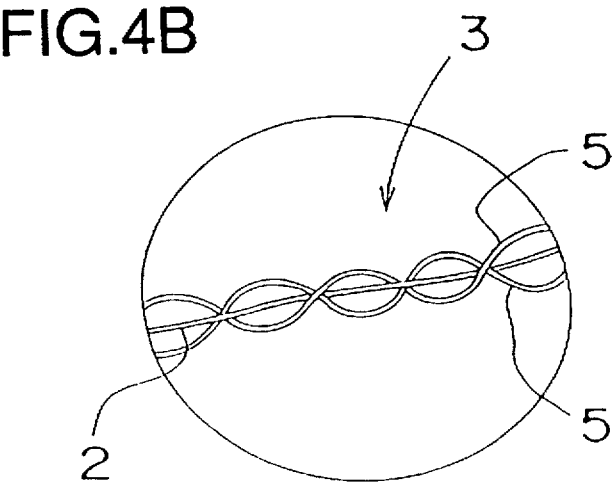
FIG. 4B is an enlarged view showing an electretic thread and a normal thread which are woven together.

As shown in FIG. 4A, the non-woven fabric 40 of the present embodiment is formed from electretic fibers 2 which include mineral microparticles composed of ceramics 4 and minerals having a spontaneous polarization property. Additionally, as shown in FIG. 4B, it is possible to use electretic yarn 3 wherein normal yarn which does not contain tourmaline or ceramics is woven with electretic fibers 2.

The front cloth 10, the textural three-dimensional structure 20, the rear cloth 30 and the non-woven fabric 40 are formed into a single structure by being sewn together at their peripheral edges, and may be sewn at their edges using a hem 51 in an example which is not shown in the drawings. As materials for the electretic fiber 2, it is possible to use the above-mentioned regenerated fibers, semi-synthetic fibers or synthetic fibers. As a specific example, among the electretic fibers 2, rayon fibers are quite porous, so that by adding ceramics 4 which emit far-iR radiation and minerals 1 which have permanent polarization properties (hereinbelow, such fibers will be referred to as J. B. F.), they can be made to emit large quantities of active ions as well as to emit far-IR radiation.

As ceramics which emit far-IR radiation, those which use alumina or silicic acid as the main component are most suitable. For example, those which emit large quantities of far-IR radiation such as cordierite, β-spodumene, zirconia, zircon, magnesia and aluminum titanate. It is possible to add transition element compounds such as manganese dioxide, iron oxide, chrome oxide, cobalt oxide and copper oxide, or silicon nitride or silicon carbide to these substances. The most preferable embodiment of J. B. F. contains 1% tourmaline and 2% ceramics.

Electretic substances are substances which maintain a state of polarization for long periods of time. The polarization can occur due to the application of an electrical charge, the alignment of permanent dipoles, or the movement of internal impurities. Tourmaline, which is a representative example of an electretic substance, polarizes spontaneously, and the spontaneous polarization is permanent. Electretic fibers are formed by mixing these types of minerals into fibers. The molecular formula of tourmaline is as follows:

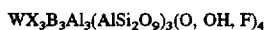

wherein W=Na or Ca; and X=Al, Fe, Li, Mg or Mn The polarization charge of tourmaline is 5.34 V at a size of 20 mm, and a polarization charge of 2.34 V has been observed even at a size of 2 mm.

Pure tourmaline is considered to be a gemstone, but it is presently possible to synthesize the crystals artificially. The present invention may use such synthetic tourmaline crystals. Tourmaline has the property that the vector orientation of its polarization does not change under the influence of external electrical fields. In addition to having the strongest permanent polarity of all minerals, tourmaline has the function of emitting far-IR radiation, has a piezoelectric effect wherein the ion crystals are dielectrically polarized in response to stress from an external force, and has a pyroelectric effect wherein heating a portion of the crystals forms an electrical charge on the surface.

The present inventors observed that active ions (anions) are emitted from a product wherein microparticle tourmaline is included in fibers (especially rayon) (J. B. F.). These active ions have the effect of increasing the activity of the autonomic neural functions and the sympathetic neural functions.

As mineral microparticles, the ceramics 4 which emit far-IR radiation should preferably be 1–10% by weight of the fibers and the tourmaline 1 having permanent polarization should preferably be 005–7% by weight of the fibers. In the case wherein tourmaline 1 has been added, the ceramics 4 content may be 0%.

With the bedding of the present invention, the tourmaline 1 emits far-IR radiation and active ions, which stimulate the cellular structures, improve the circulation of blood, and promote the metabolism. Additionally, the electrical conduction paths within the body are stimulated so as to activate the sympathetic neural functions.

Additionally, when the body is shifted while lying on top of the bedding of the present invention, kinetic energy is applied to the electretic fibers 2 to induce a piezoelectric effect in the tourmaline 1, thereby generating more active ions.

Additionally, a pyroelectric effect can be induced by exposing the bedding of the present invention to sunlight, thereby causing a large quantity of active ions to be emitted. Since the bedding of the present invention is able to be made thin and lightweight by using the textural three-dimensional structure 20, it can be wholly washed with an electric washer, and can be easily dried. Additionally, it is well ventilated, stays dry, and has an appropriate amount of elasticity so as to prevent bedsores. The honeycomb structure of the textural three-dimensional structure 20 combines a pressure reduction effect of spreading the bodily pressure with a ventilation/drying effect, thereby preventing the bacteria which cause bedsores from multiplying. Additionally, the emission of active ions largely increases when a non-woven fabric 40 containing tourmaline 1 is added.

During the summer or in hot regions, the ventilation provided by the honeycombs offer a cool, refreshing sensation when the present invention is used with the side having a honeycombed structure facing up. On the other hand, during the winter or in cold regions, the warming effect of the non-woven fabric 40 can be increased by using the present invention with the side having the non-woven fabric facing up. Furthermore, when aluminum materials are provided in a portion or the entirety of the rear cloth 30, the far-IR radiation emitted from the upper layers can be reflected in order to efficiently warm the bedding.

Hereinbelow, the structures of possible embodiments of the bedding of the present invention will be explained with reference to the drawings.

EMBODIMENT 1

The bedding shown in FIGS. 1 and 2 was actually made for test purposes. This bedding was composed of a front cloth 10, a textural three-dimensional structure 20 and a rear cloth 30; the textural three-dimensional structure 20 was arranged in a large-celled honeycomb 24 pattern with two layers. The large-celled honeycombs 24 had a structure as shown in FIG. 5 wherein a=7 mm, b=5 mm and h=5 mm. Electretic fibers 2 were used in the front cloth 10 and the textural three-dimensional structure 20. The resulting bedding was extremely lightweight, well-ventilated and easy to wash.

EMBODIMENT 2

Figure 3:
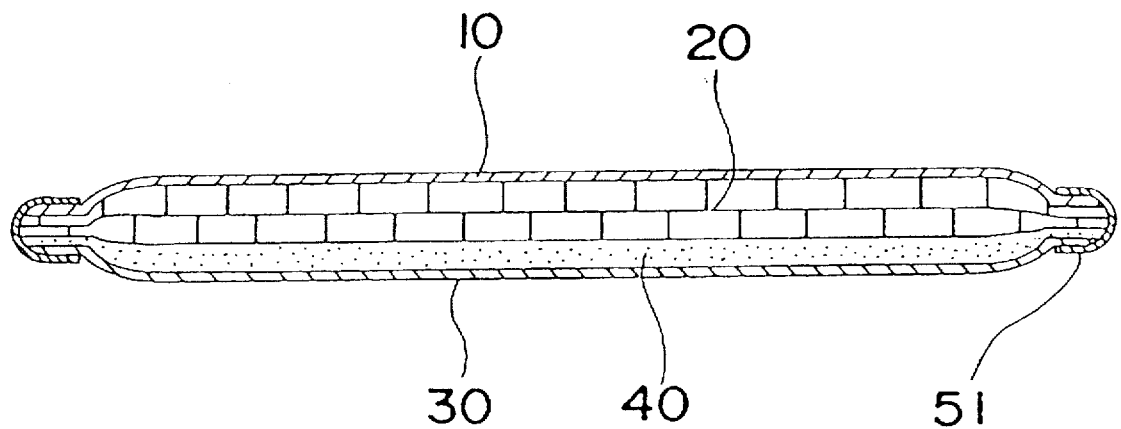
FIG. 3 is a section view showing another embodiment of the present invention.

The bedding of the present embodiment is shown in FIG. 3. This embodiment is the same as Embodiment 1, with the exception that a non-woven fabric 40 formed from electretic fibers 2 is disposed underneath the textural three-dimensional structure 20. The present embodiment is characterized in that the quantity of active ion emission is large, as well as being lightweight, well-ventilated and easy to wash.

EMBODIMENT 3

Figure 6:
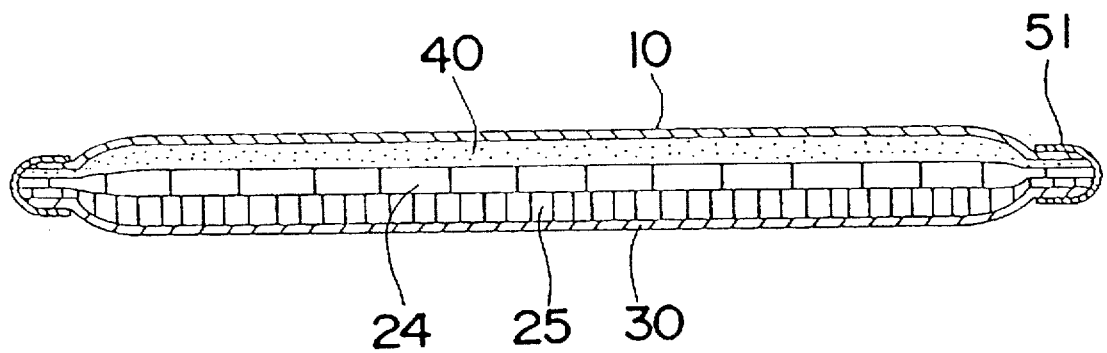
FIG. 6 is a section view showing another embodiment of the present invention.
Figure 7:
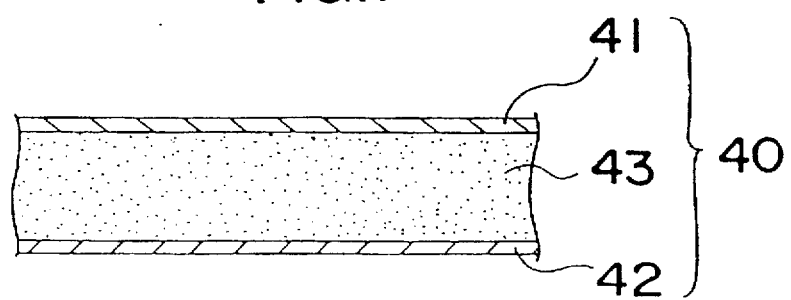
FIG. 7 is an enlarged section view of an example of a nonwoven fabric as may be used in the present invention.
Figure 8:
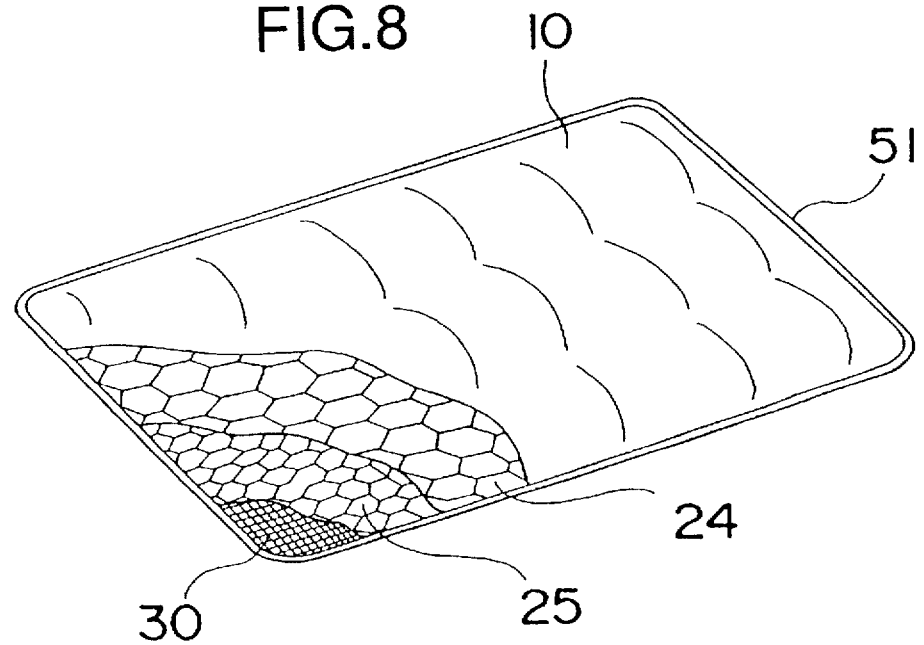
FIG. 8 is a cutaway perspective view showing another embodiment of the present invention.

The bedding of the present embodiment is shown in FIGS. 6–8. A non-woven fabric 40 formed from electretic fibers 2 is disposed underneath the front cloth 10, and a large-celled honeycomb 24 and a small-celled honeycomb 25 are disposed underneath the front cloth 10. The small-celled honeycomb 25 has the structure shown in FIG. 5, wherein a=3 mm, b=2 mm and h=3 mm. The small-celled honeycombs 25 are harder than the large-celled honeycombs 24, so that the hardness of the base portion can be increased for use as a pad by providing the small-celled honeycombs 25 directly over the rear cloth 30. The rear cloth 30 contains aluminum material on a portion or the entirety thereof, so as to reflect far-IR radiation from the upper layers. The non-woven fabric 40 is formed by disposing the extremely thin and compacted paper-type non-woven fabric 41 and 42 above and below a central non-woven fabric 43 as shown in FIG. 7, in order to suppress the formation of lint in the central non-woven fabric 43.

According to Embodiment 3, non-woven fabric 40 formed from electretic fibers 2 is provided on the side facing the body, so that it is warmer and supplies more active ions to the body. FIG. 8 is a partially cutaway perspective view showing the large-celled honeycombs 24 and the small-celled honeycombs 25 of Embodiment 3.

EMBODIMENT 4

Figure 9:
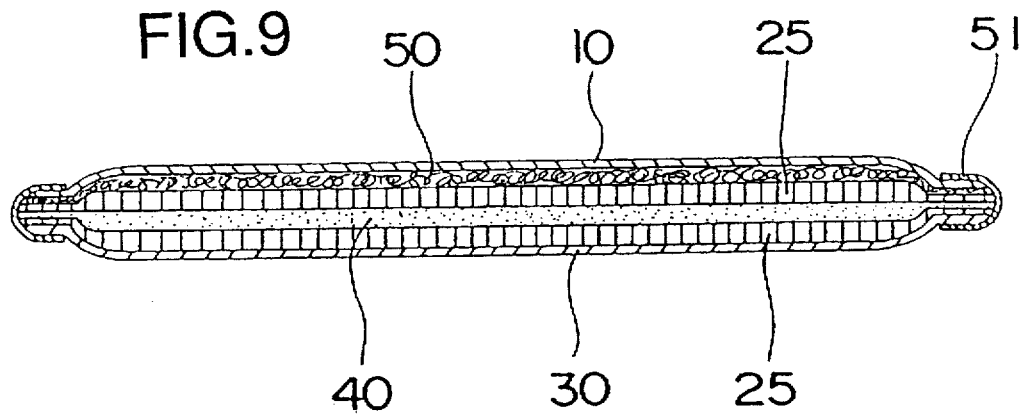
FIG. 9 is a section view showing another embodiment of the present invention.

The bedding of the present embodiment is shown in FIG. 9. This embodiment has a layered structure comprising, from the top, a front cloth 10, cushioning fleece 50, a small-celled honeycomb 25, non-woven fabric 40, a small-celled honeycomb 25, and a rear cloth 30. The cushioning fleece 50, which conveys a sense of softness with polyester fleece, is lightweight and easy to dry after washing. Additionally, the small-celled honeycomb 25 is provided for ventilation and to increase the hardness as a bedding. In this embodiment, electretic fibers 2 are used in the non-woven fabric 40 and in the small-celled honeycomb 25 provided above the non-woven fabric. Additionally, the rear cloth 30 includes aluminum material in a portion or the entirety thereof.

EMBODIMENT 5

Figure 10:
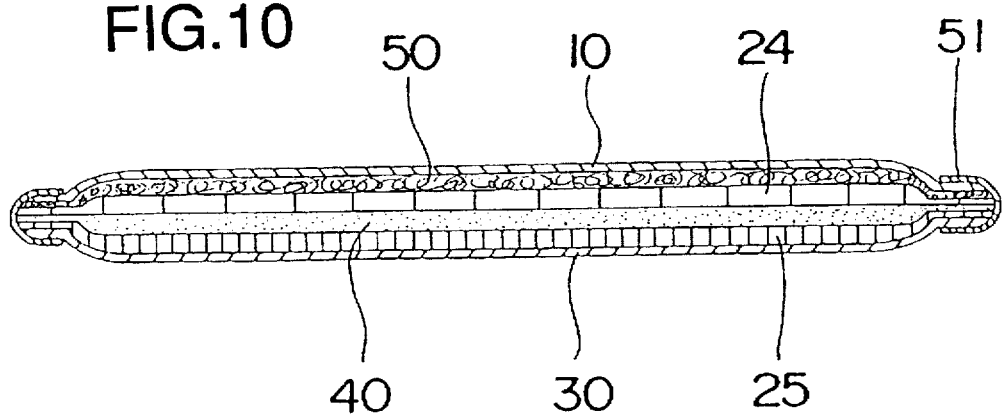
FIG. 10 is a section view showing another embodiment of the present invention.

The bedding of the present embodiment is shown in FIG. 10. This embodiment is different from Embodiment 4 in that a large-celled honeycomb is provided underneath the cushioning fleece 50 in order to convey an even softer sensation. Additionally, etectretic fibers 2 are used in this large-celled honeycomb 24 and in the non-woven fabric 40 underneath the large-celled honeycomb 24. The rear cloth 30 includes aluminum material in a portion or the entirety thereof.

EMBODIMENT 6

Figure 11:
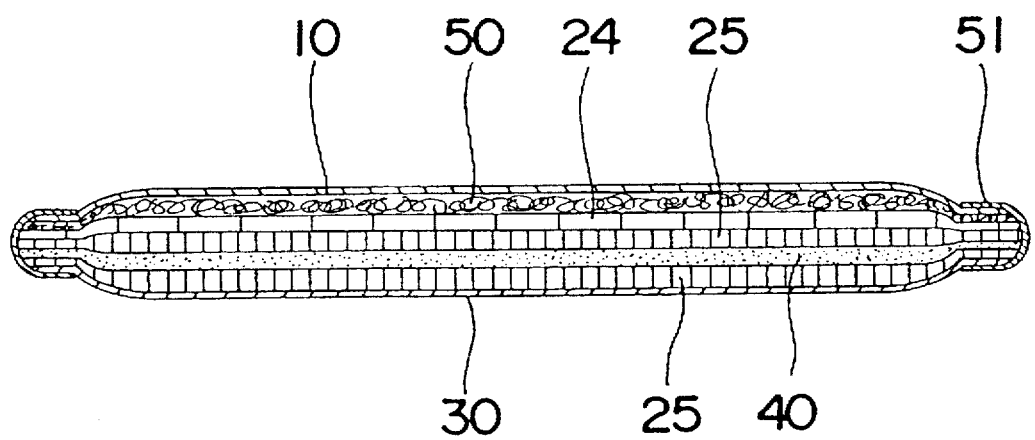
FIG. 11 is a section view showing another embodiment of the present invention.

The bedding of the present embodiment is shown in FIG. 11. This embodiment is different from Embodiment 5 in that a small-celled honeycomb 25 is provided underneath the large-celled honeycomb 24. As a result, a softer sensation is conveyed, the ventilation is made better, and the hardness of the bedding overall is increased. In this embodiment, electretic fibers 2 are used in the front cloth 10 and the non-woven fabric 40. Additionally, the rear cloth 30 includes aluminum material in a portion or the entirety thereof.

While Embodiments 1–6 are explained in detail above, the present invention is not restricted by the structures of the embodiments; for example, the front side and the rear side may be reversed, or the portions wherein the electretic fibers 2 are used can be changed as appropriate. Additionally, while the explanation was directed to embodiments of sleeping pads or mattresses, these structures may also be applied to comforters or blankets.

EXAMPLES

Experiment 1

A: rayon fiber containing tourmaline 1 and ceramics 4 (J. B. F.)

B: rayon fiber containing ceramics 4

C: rayon fiber only

Figure 13:
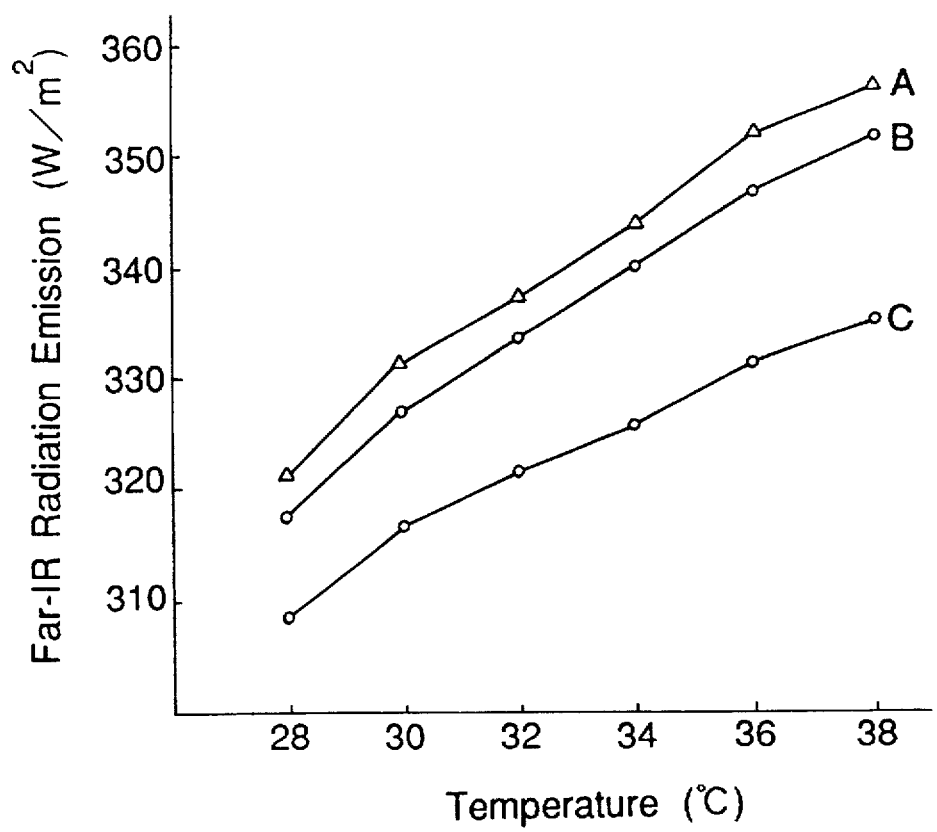
FIG. 13 is a graph comparing the far-IR emissions of a conventional bedding and the bedding of the present invention.

The above-listed three samples were brought to temperatures near body temperature (28°–38° C.), and the far-IR radiation emissions (W/m$^2$) were measured. The results are shown in FIG. 13. From these results, it can be deduced that the J. B. F. of sample A emits the largest quantity of far-IR radiation.

Experiment 2

The test material activity measuring device 60 shown in FIG. 12 was used to evaluate the ion emissions of fibers by passing air through the fibers and dissolving the air into distilled water, then measuring the electrical conductivity change in the distilled water.

First, each test material was attached to a test material attachment portion 63 provided inside the activation vessel 62, and air was sent to the activation vessel 62 by means of an air pump 61. The test material on the test material attachment portion 63 was held at 37 degrees (body temperature) by means of a heat generating body 64 such as a ceramic material provided within the activation vessel 62. For this reason, a thermometer 65 and a temperature sensor 66 were placed within the activation vessel 62. The air passing through the activation vessel 62 was supplied to the measuring device 70. The measuring device 70 comprises a constant-temperature bath 71, a beaker 72, distilled water 73, a platinum rod 74 and an electrical conductometer 75 (product of YHP Corp., commercial name: "Presion LCR meter"). The electrical conductivity of the distilled water 73 was measured while holding the temperature of the fiber at 37° C. and the flow rate at 100 ml/minute.

Samples were made by cutting out cylindrical portions of the above-mentioned Embodiments 1, 2 and 6, and placed on the test material attachment portion 63. As a sample of rayon fiber, a ball of only rayon fibers which did not include tourmaline or the like was placed in the test material attachment portion 63. The relationship between the measurement time and the electrical conductivity of the distilled water for each of the fibers is shown in FIG. 14.

Figure 14:
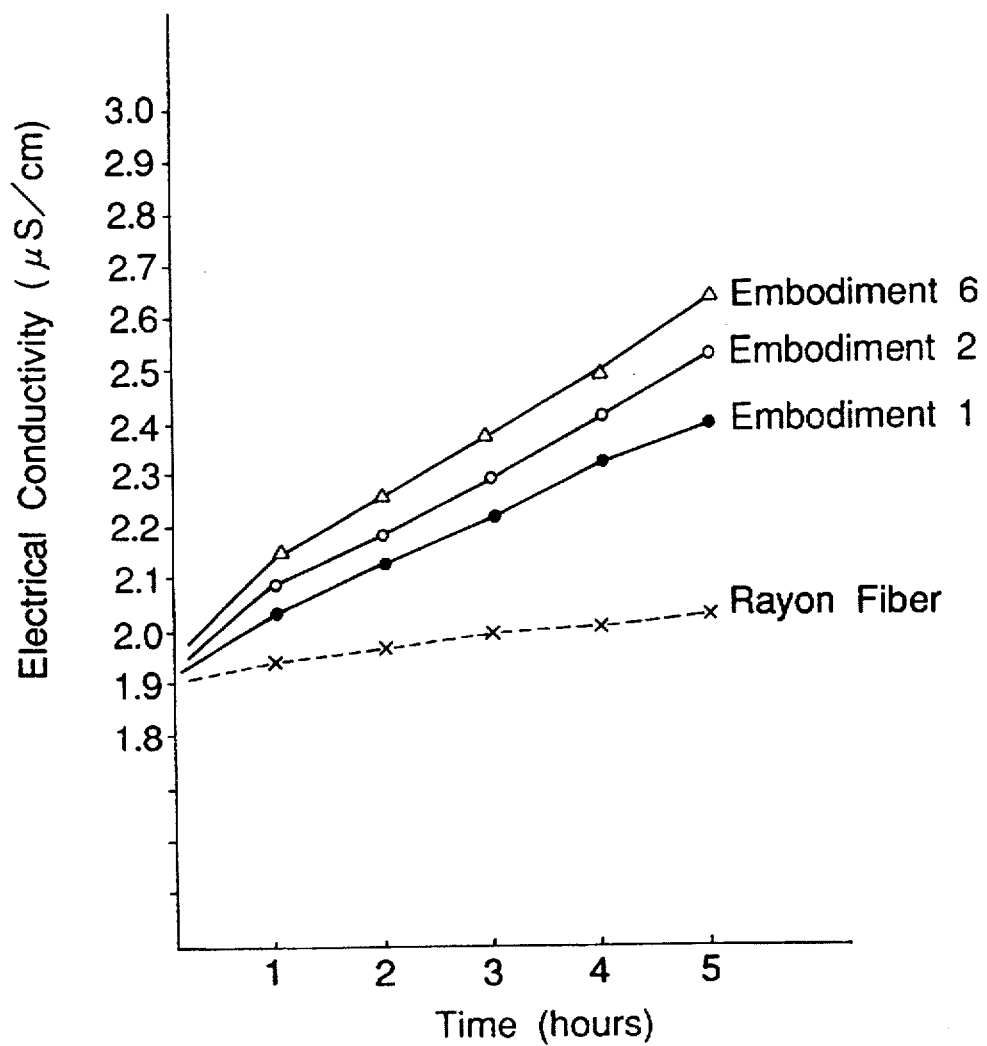
FIG. 14 is a graph of the electrical conductivity for evaluating the ion emissions of the fibers.

As is clear from FIG. 14, the beddings of Embodiments 1, 2 and 6 each exhibited much higher electrical conductivity values than those of the rayon fiber, and among them, Embodiment 6 exhibited the highest values. Additionally, while not shown in the drawings, the electrical conductivity values after three hours of measurement for Embodiments 3, 4 and 5 all lied between the values for Embodiment 2 and Embodiment 6.

Experiment 3

A sleeping pad was made from non-woven fabric formed of electretic fibers, and another sleeping pad was made from cotton fleece. When the test of Experiment 2 was performed on the sleeping pad of the present invention containing electretic fibers, the electrical conductivity after four hours was 2.45 μS. On the other hand, when the test of Experiment 2 was performed on the cotton sleeping pad, the electrical conductivity after four hours was 2.01 μS. Healthy adult test subjects were asked to sleep facing upwards on the two types of pads, and the heat distribution on their skin was measured by thermography in a constant-temperature shielded room. Thermography is a process by which the heat on the skin is filmed by means of a highly sensitive infrared camera, then displayed by replacing the temperature distribution (thermograph) using 10 colors.

As a result, it was observed that the electretic pad of the present invention raised the skin temperature of both feet by approximately 1.0° C. during and after lying down on the bedding, and that the blood flow was stimulated. On the other hand, with the cotton pad, the temperature dropped during and after lying down on the bedding. Thus, it was discovered that the electretic fibers can increase the heat on the skin and make the blood flow more active.

Additionally, it was discovered that measurement of the electrical conductivity of water allows the activation effect with respect to bodily cells, i.e. the activity of blood flow underneath the skin, to be evaluated.

Experiment 4

The influence of the pad of the present invention on the human body, especially the influence on autonomic and sympathetic nerves, was evaluated by a clinical test.

Using the bedding of the present invention (the embodiment shown in FIG. 3) and a normal cotton pad, nine healthy subjects were lain down to sleep and the electrical resistance on the skin between points on the body was recorded at 0 minutes, 20 minutes, 40 minutes and 60 minutes after the beginning of the experiment, using a Neurometer (trade name). In each case, an electrical heater placed underneath the pad was turned on between 20 and 40 minutes after the beginning of the experiment in order to apply warmth under the same conditions.

Figure 15:
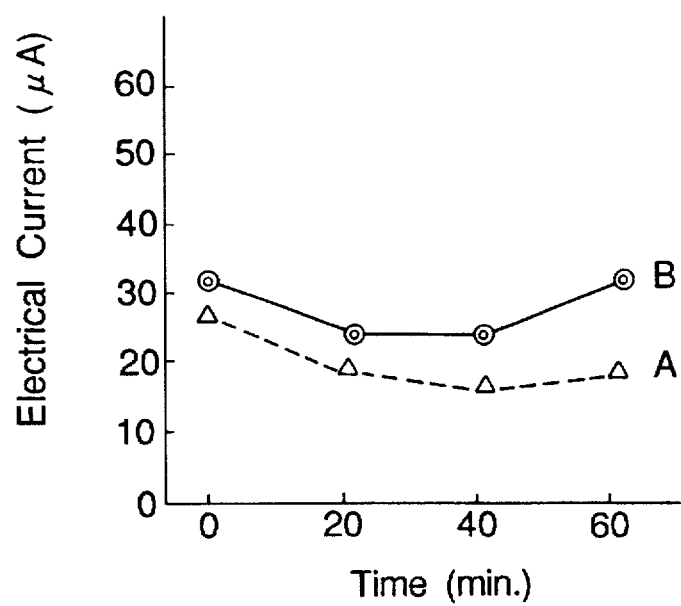
FIG. 15 is a graph showing the physiological activation effect of the bedding of the present invention.

FIG. 15A shows the results with a normal cotton pad, while FIG. 15B shows the results with the bedding of the present invention (the embodiment shown in FIG. 3).

As shown in the graph, the electrical current flowing through the bodies as measured by the Neurometer showed almost no change in the case (A) of a cotton pad. On the other hand, with the pad (B) of the present invention, while no difference was apparent during heating, an increase of 11.5 μA was observed 20 minutes after the heating was stopped (60 minutes after the beginning of the experiment). This is believed to result from the activation of the sympathetic neural function, which has "excited" the paths by which electricity travels between points on the human body.

I claim:

1. A bedding comprising:

a front cloth;

a textural three-dimensional structure woven three-dimensionally; and a rear cloth; wherein fibers within at least a portion of said front cloth, said textural three-dimensional structure, and said rear cloth are electretic fibers which contain microparticles of tourmaline; and peripheral portions of said front cloth, said textural three-dimensional structure, and said rear cloth are mutually affixed;

wherein said electretic fibers are affixed with 0.05–7.0% by weight of tourmaline and 1.0–10% by weight of ceramics.

2. The bedding according to claim 1, wherein a non-woven fabric containing said microparticles of said tourmaline is provided between said front cloth and said rear cloth.

3. The bedding according to claim 1, wherein said textural three-dimensional structure is woven from yarn spun with said electretic fibers containing microparticles of said tourmaline.

4. The bedding according to claim 1, wherein at least a portion of said rear cloth contains aluminum material which reflects far-IR radiation.

5. The bedding according to claim 1, wherein said textural three-dimensional structure has a honeycombed structure.

6. The bedding according to claim 1, wherein electretic fibers are formed from at least one type of fiber selected from the group consisting of rayon, cuprammonium rayon, acetate, polyester, polyurethane, polyamide, polyvinyl chloride, polyvinyl alcohol, and polyacryl; and at least a portion of said fibers is affixed with tourmaline.

7. The bedding according to claim 1, wherein said electretic fibers are rayon fibers with microparticles of said tourmaline affixed to the surface.

8. The bedding according to claim 1, wherein said electretic fibers are affixed with at least one type of ceramic particle chosen from the group consisting of cordierite, β-spodumene, zirconia, zircon, magnesia and aluminum titanate.

9. The bedding according to claim 1, wherein said textural three-dimensional structure has a two-layered structure of a large-celled honeycomb structure sheet and a small-celled honeycomb structure sheet.

* * * * *